US008364152B2

(12) United States Patent
Rajasimman et al.

(10) Patent No.: US 8,364,152 B2
(45) Date of Patent: Jan. 29, 2013

(54) MACROCELL TO FEMTOCELL AND FEMTOCELL TO FEMTOCELL HANDOFF

(75) Inventors: Vijayasimman Rajasimman, Plano, TX (US); Nivedan Thadasina, Allen, TX (US); John Jubin, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 246 days.

(21) Appl. No.: 12/724,852

(22) Filed: Mar. 16, 2010

(65) Prior Publication Data

US 2011/0053600 A1 Mar. 3, 2011

Related U.S. Application Data

(60) Provisional application No. 61/237,268, filed on Aug. 26, 2009.

(51) Int. Cl.
*H04W 36/00* (2009.01)
(52) U.S. Cl. .......................... 455/442; 370/331; 370/329
(58) Field of Classification Search .................. 370/331, 370/329, 311, 219; 455/444, 442, 436, 438
See application file for complete search history.

(56) References Cited

U.S. PATENT DOCUMENTS

| 2008/0305801 | A1* | 12/2008 | Burgess et al. ............... 455/444 |
| 2009/0196253 | A1* | 8/2009 | Semper ......................... 370/331 |
| 2011/0194530 | A1* | 8/2011 | Tinnakornsrisuphap et al. ............................. 370/331 |

* cited by examiner

*Primary Examiner* — Phuoc Doan
(74) *Attorney, Agent, or Firm* — Jefferson IP Law, LLP (57) ABSTRACT

A Wireless Soft Switch (WSS) and method for handing off a Mobile Station (MS) from a Macrocell Base Station (MBS) to Femtocell Base Station (FBS), and a FBS and method for handing off from the FBS to another FBS, are provided. A method for handing off an MS from an MBS to a target FBS in a wireless network receiving, by a Wireless Soft Switch (WSS), a message indicating that handoff of an MS to an FBS should be performed, determining, by the WSS, one or more candidate FBSs for the handoff, determining, by the WSS, the target FBS, from the one or more candidate FBSs, to which the MS is to handoff, and exchanging messages with the MS, MBS, and the target FBS for the handoff of the MS from the MBS to the target FBS.

21 Claims, 8 Drawing Sheets

MACROCELL TO FEMTOCELL AND FEMTOCELL TO FEMTOCELL HANDOFF

CROSS-REFERENCE TO RELATED APPLICATIONS

This application claims the benefit under 35 U.S.C. §119(e) of a U.S. Provisional application filed on Aug. 26, 2009 in the U.S. Patent and Trademark Office and assigned Ser. No. 61/237,268, the entire disclosure of which is hereby incorporated by reference.

BACKGROUND OF THE INVENTION

1. Field of the Invention

The present invention relates to handoff in a wireless communication system. More particularly, the present invention relates to a technique for Macrocell to Femtocell and Femtocell to Femtocell handoff in a wireless communication system.

2. Description of the Related Art

In a typical wireless cellular communication system, service, such as a voice and/or data service, is provided to Mobile Stations (MSs) through a plurality of Macrocell Base Stations (MBSs). Each of the MBSs is responsible for providing service to MSs located within their respective service coverage area. The service coverage area of an MBS is hereafter referred to as a Macrocell. To facilitate mobility of the MSs, handoff between MBSs is performed when the MS leaves one Macrocell for another.

In the wireless cellular communication system, a channel may deteriorate due to a number of factors, including a geographical factor inside a Macrocell, a distance between an MS and an MBS, movement of the MS, etc. Channel deterioration is problematic since it may result in a disruption of communication between the MS and the MBS. For example, when the MS is located inside a structure, such as an office building or a house, a channel between the MBS and the MS may deteriorate due a shadow region that is formed by the structure. A shadow region formed within the structure is hereafter referred to as an indoor shadow region. The MS located in the indoor shadow region may not be able to adequately perform communication with the MBS.

Recently, a Femtocell concept is proposed in order to provide ubiquitous connectivity to MSs while addressing a service limitation of an indoor shadow region. The term "Femto" is a prefix denoting a factor of $10^{-15}$ in the International System of Units. In the context of telecommunications, the term "Femtocell" refers to the service coverage area of a Femtocell BS (FBS) and is much smaller than a Macrocell. And, the term "FBS" refers to a low cost small cellular BS that is designed to service a small number of MSs as compared to an MBS. In addition, installation of the FBS is significantly easier than installation of the MBS and may be performed by a user of an MS.

The FBS enables service providers to extend service coverage of the wireless cellular communication system indoors, especially where access would otherwise be limited or unavailable, such as the indoor shadow region. In order to provide the service of the wireless cellular communication system, the FBS may communicate with the backbone network of wireless cellular communication system through a commercial broadband network.

The deployment of an FBS improves both the coverage and capacity of the wireless cellular communication system. Since the FBS allows a small number of MSs to use dedicated air resources in its reduced size coverage area, unlike the MBS in which bandwidth is shared by a large number of users, it is possible to provide a high level of service. Going forward, the advantages of deployment of the FBS are expected to be increasingly leveraged in wireless cellular communication systems.

In the meantime, similar to the need for handoff between MBSs, handoff between the Femtocell and the Macrocell, and handoff between Femtocells, is a key function in securing service continuity of an MS.

Since a large number of Femtocells can be deployed within a Macrocell, there are many problems to be addressed to enable an MS to perform handoff between the Femtocells and Macrocells, especially handoff from the Macrocell to a Femtocell, and handoff between the Femtocells.

One technique to perform handoff between the Femtocells and Macrocells, and between the Femtocells, would be to use the technique employed for handoff between the Macrocells. To facilitate handoff between the Macrocells, each MBS is populated with information on neighboring MBSs. Since there are a finite number of neighboring MBSs, the neighboring MBSs may be manually identified during cell planning and used to populate a neighbor list that is stored at each MBS. Also, in a given area, Macrocell Pseudo-random Noise (PN) codes are unique to each MBS and do not overlap. This allows mapping of a neighboring Macrocell PN code to its corresponding Cell Identifier, which enables handoff routing.

However, the technique described above for populating the neighbor lists with information on neighboring MBSs does not scale for Macrocell to Femtocell handoffs for two reasons. First, the number of Femtocells within a Macrocell could be so large that populating individual Femtocell identifiers is not feasible. Also, Femtocells typically re-use Pilot PN codes, so mapping of a Femtocell PN code to Femtocell Cell Identifier at an MBS may not be possible.

Therefore, a need exists for a technique for Macrocell to Femtocell and Femtocell to Femtocell handoff in a wireless communication system.

SUMMARY OF THE INVENTION

An aspect of the present invention is to address at least the above-mentioned problems and/or disadvantages and to provide at least the advantages described below. Accordingly, an aspect of the present invention is to provide techniques for Macrocell to Femtocell and Femtocell to Femtocell handoff in a wireless communication system.

In accordance with an aspect of the present invention, a method for handing off a Mobile Station (MS) from a Macrocell Base Station (MBS) to a target Femtocell Base Station (FBS) in a wireless network is provided. The method includes receiving, by a Wireless Soft Switch (WSS), a message indicating that handoff of an MS to an FBS should be performed, determining, by the WSS, one or more candidate FBSs for the handoff, determining, by the WSS, the target FBS, from the one or more candidate FBSs, to which the MS is to handoff, and exchanging messages with the MS, MBS, and FBS for the handoff of the MS from the MBS to the target FBS.

In accordance with another aspect of the present invention, a WSS apparatus for use in a wireless network to handoff a MS from an MBS to a target FBS is provided. The apparatus includes a first transceiver for transmitting to and receiving messages from one or more FBSs, a second transceiver for transmitting to and receiving messages from the MBS, and a controller. The controller controls to receive a message indicating that handoff of an MS to an FBS should be performed, determines one or more candidate FBSs for the handoff, determines the target FBS, from the one or more candidate FBSs, to which the MS is to handoff, and controls to exchange messages with the MS, MBS, and the target FBS for the handoff of the MS from the MBS to the target FBS.

In accordance with yet another aspect of the present invention, a method for handing off an MS from a serving FBS to a target FBS in a wireless network is provided. The method includes sending, by the serving FBS, a message to the MS including neighbor information that comprises a frequency allocation and PN code used by each of the FBSs neighboring the serving FBS, receiving, by the serving FBS, a message from the MS including a frequency allocation and PN code used by an FBS detected by the MS, determining, by the serving FBS, an identifier for each of at least one candidate FBS using the frequency allocation and PN code received from the MS, sending, by the serving FBS, a message to a WSS indicating that handoff of the MS should be performed, the message including the determined identifier for each of the at least one candidate FBS using the frequency allocation and PN code received from the MS, and exchanging messages, by the serving FBS, with the MS and WSS for the handoff of the MS from the serving FBS to the target FBS, wherein the target FBS is one of the at least one candidate FBS using the frequency allocation and PN code received from the MS.

In accordance with still another aspect of the present invention, an FBS apparatus for use in a wireless network to handoff an MS to a target FBS is provided. The apparatus includes a first transceiver for transmitting to and receiving messages from a WSS, a second transceiver for transmitting to and receiving messages from the MS, and a controller. The controller controls to send a message to the MS including neighbor information that comprises a frequency allocation and Pseudo-random Noise (PN) code used by each of the FBSs neighboring the FBS, controls to receive a message from the MS including a frequency allocation and PN code used by an FBS detected by the MS, determines an identifier for each of at least one FBS using the frequency allocation and PN code received from the MS, controls to send a message to the WSS indicating that handoff of the MS should be performed, the message including the determined identifier for each of the at least one FBS using the frequency allocation and PN code received from the MS, and controls to exchange messages with the MS and WSS for the handoff of the MS from the FBS to the target FBS, wherein the target FBS is one of the at least one FBS using the frequency allocation and PN code received from the MS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention described below relate to a technique for handoff in a wireless communication system. More specifically, exemplary embodiments of the present invention described below relate to a technique for Macrocell to Femtocell and Femtocell to Femtocell handoff in a wireless communication system. While the handoff according to exemplary embodiments of the present invention may be hard handoff, other types of handoff are equally within the scope of the exemplary embodiments of the present invention.

It should be understood that the following description might refer to terms utilized in various standards merely for simplicity of explanation. For example, the following description may refer to terms utilized in the Institute of Electrical and Electronics Engineers (IEEE) 802.16m standard or the $3^{rd}$ Generation Partnership Project (3GPP) Long Term Evolution (LTE) standard. However, this description should not be interpreted as being limited to the IEEE 802.16m or 3GPP LTE standards. Independent of the mechanism used for handoff, it is preferable to perform handoff and it is advantageous for that ability to conform to a standardized mechanism.

Exemplary embodiments of the present invention will be described in the context of a wireless communication system described below with reference to FIG. 1.

Figure 1:
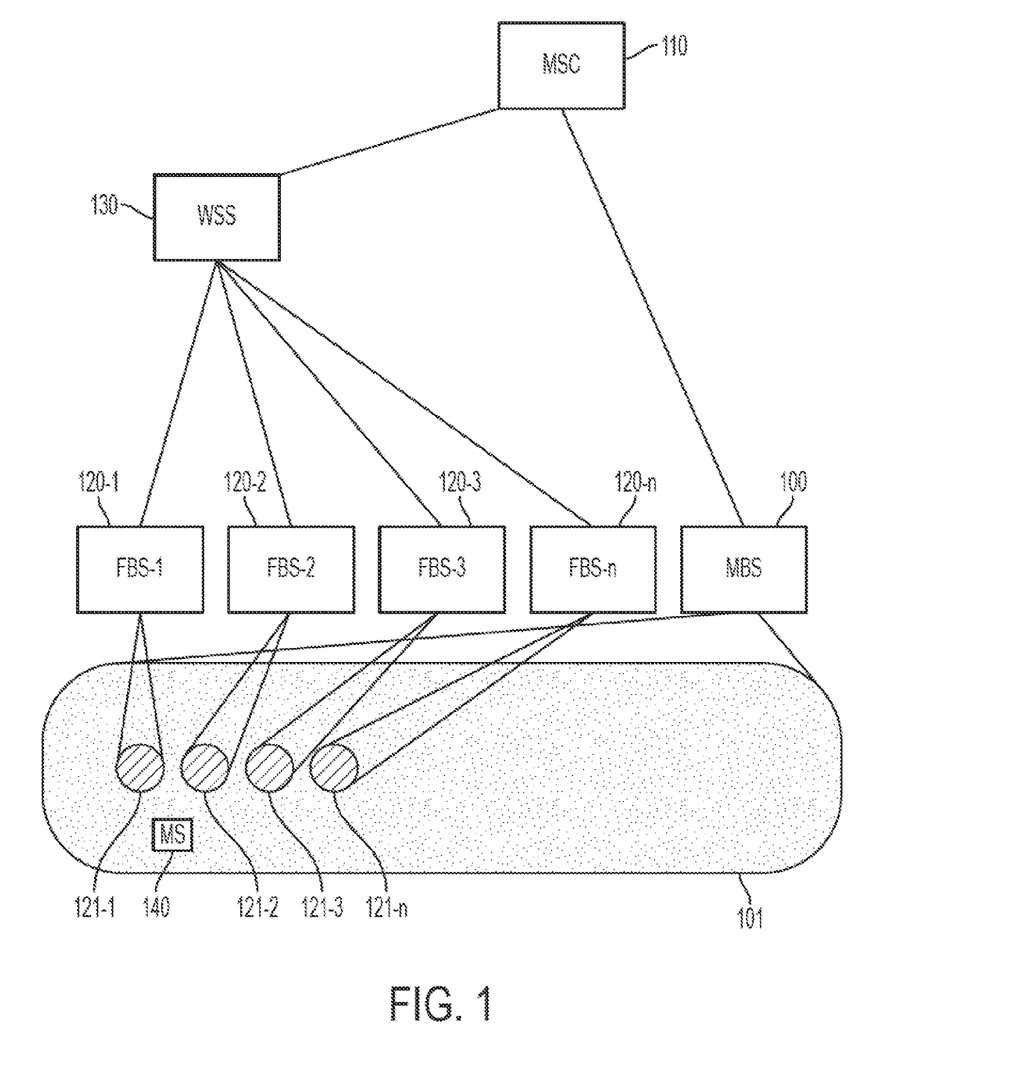
FIG. 1 illustrates a wireless communication system for performing handoff according to an exemplary embodiment of the present invention.

FIG. 1 illustrates a wireless communication system for performing handoff according to an exemplary embodiment of the present invention.

Regarding FIG. 1, the wireless communication system includes a Macro Base Station (MBS) 100 servicing a Macrocell 101, a Mobile Switching Center (MSC) 110, a plurality of Femtocell BSs (FBSs) 120-1 . . . 120-n servicing respective Femtocells 121-1 . . . 121-n located within Macrocell 101, a Wireless Soft Switch (WSS) 130, and a Mobile Station (MS) 140. The term "Femtocell" may be used interchangeably with the term "FBS."

This configuration of the wireless communication system is merely an example. Exemplary embodiments of the present invention are equally applicable to other configurations of the wireless communication system. For example, the wireless communication system may include any number of additional MBSs, MSCs, FBSs. WSSs and MSs. Further, the wireless communication system may include other network elements, which are omitted herein for conciseness. In addition, the wireless communication system may be a wireless communication system operating according to the IEEE 802.16m standard, 3GPP LTE standard, or any other wireless communication standard.

Any number of Femtocells 121-1 . . . 121-n may at least partially overlap with any number of other Femtocells 121-1 . . . 121-n. Further, at least a portion of any number of Femtocells 121-1 . . . 121-n may be disposed outside Macrocell 101 and/or overlap with another Macrocell (not shown). While Femtocells 121-1 . . . 121-n are assumed to be of the same type, any number of the Femtocells 121-1 . . . 121-n may be of different types.

The MSC 110 communicates with MBS 100 and WSS 130. Alternatively, or in addition, MBS 100 and WSS 130 may directly communicate with each other. The communications between MBS 100 and WSS 130 may occur in a backbone network of the wireless communication system. The FBSs 120-1 . . . 120-n may communicate with WSS 130 through a commercial broadband network. FBSs 120-1 . . . 120-n may communicate with each other through WSS 130. Alternatively, or in addition, FBSs 120-1 . . . 120-n may directly communicate with each other through at least one of a direct wireless connection or a commercial broadband connection. FBSs 120-1 . . . 120-n may directly communicate with at least one of MSC 110 and MBS 100.

MS 140 may be mobile or stationary and may be located inside or outside any of Macrocell 101 and Femtocells 121-1 . . . 121-n. Handoff between any of the MBS 100 and FBSs 120-1 . . . 120-n is employed for service continuity of the MS 140.

Techniques for handoff according to exemplary embodiments of the present invention will be described below in the context of the exemplary wireless communication system described above with reference to FIG. 1.

Macrocell to Femtocell Handoff

A technique for Macrocell to Femtocell handoff according to an exemplary embodiment of the present invention is described below with reference to FIG. 2.

Figure 2:
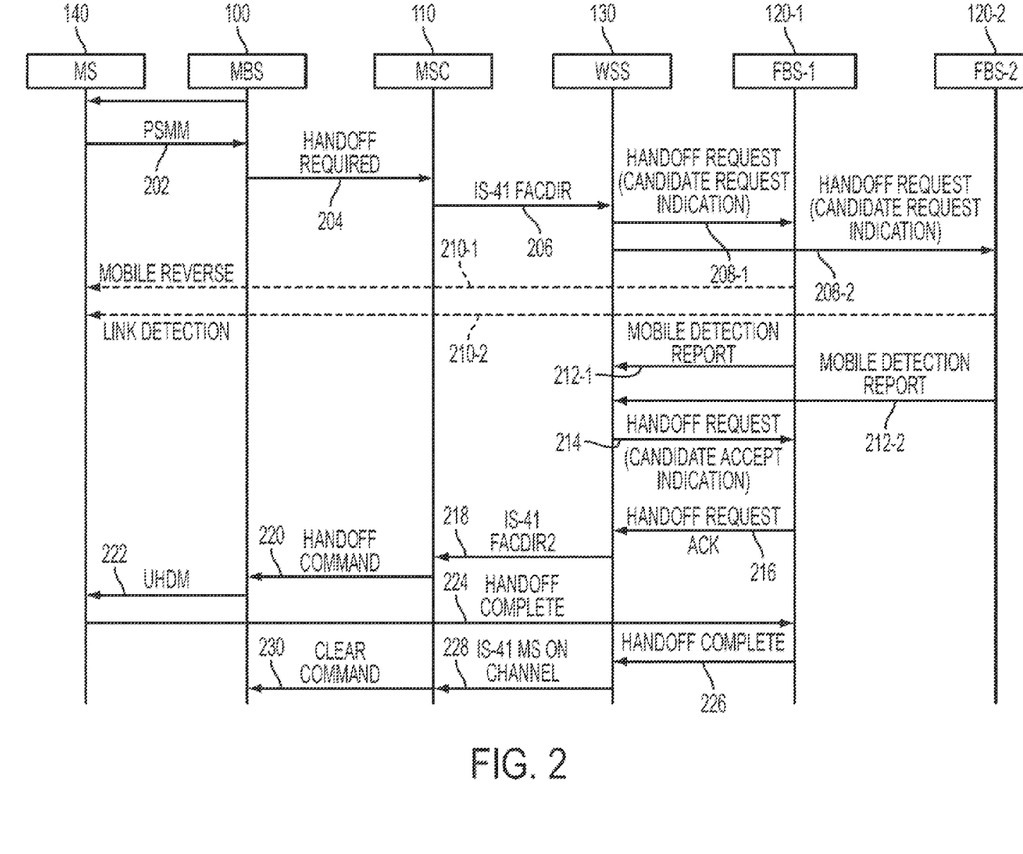
FIG. 2 is a signal diagram for Macrocell to Femtocell handoff in a wireless communication system according to an exemplary embodiment of the present invention.

FIG. 2 is a signal diagram for Macrocell to Femtocell handoff in a wireless communication system according to an exemplary embodiment of the present invention.

Referring to FIG. 2, while MS 140 is being serviced by MBS 100, MBS 100 transmits a neighbor list to MS 140 in step 200. The neighbor list is retained by MBS 100 and includes Cell Identifiers of neighboring MBSs, Femtocell Pseudo-random Noise (PN) codes and a mapping of the Femtocell PN codes to corresponding WSS Switching Identifiers. The Femtocell PN codes comprise a small set of PN codes that are dedicated for use by all FBSs. While the neighbor list includes Cell Identifiers of neighboring MBSs, the neighbor list does not have to include Cell Identifiers of FBSs. In addition, the neighbor list does not need to account for the operational carriers (also referred to herein as Frequency Allocations (FAs)) used by FBSs since Macrocell to Femtocell handoff is an intra-carrier handoff assisted via FBS beacon signals (also referred to as pilot signals). The above factors reduce the complexity of the neighbor list retained by the MBS 100 to support Macrocell to Femtocell handoff.

MS 140 uses the dedicated Femtocell PN codes when detecting Femtocells. To detect Femtocells, MS 140 detects pilot signals transmitted by FBSs. While the MS 140 may detect one or more FBSs, for ease of explanation, it will be assumed herein that the MS 140 detects one FBS, namely FBS 120-1. Of course, the MS 140 may detect more than one FBS. Accordingly, when MS 140 has an active connection through MBS 100 and approaches FBS 120-1 and FBS 120-2, MS 140 detects the pilot signal transmitted by FBS 120-1 and measures a signal strength of each of the pilot signals. MS 140 then transmits a Pilot Strength Measurement Message (PSMM) to MBS 100 in step 202. Here, the PSMM includes the Femtocell PN codes utilized by FBS 120-1.

Upon receiving the PSMM from MS 140 at step 202, MBS 100 determines if criteria for Macrocell to Femtocell handoff is met. To determine if the criteria for Macrocell to Femtocell handoff is met, MBS 100 may use a T_COMP parameter. In other words, MBS 100 may determine the signal strength of the pilot signal received from FBS 120-1 is greater than a signal strength of a signal received from MBS 100 by MS 140. If the signal strength of the pilot signal received from FBS 120-1 is greater than the signal strength received from MBS 100 by MS 140, MBS 100 determines that criteria for Macrocell to Femtocell handoff is met. Herein, it will be assumed that criteria for Macrocell to Femtocell handoff is met for FBS 120-1. It is noted that while the MS 140 and MBS 100 know the Femtocell PN code used by FSB 120-1 and the signal strength of the pilot signal received from FBS 120-1, neither MS 140 nor MBS 100 know that identity of FBS 120-1.

The MBS 100 also determines a WSS Switching Identifier that corresponds to the Femtocell PN code received from MS 140 in the PSMM for each of FBS 120-1 and FBS 120-2. MBS 100 then transmits a Handoff Required message to MSC 110 that includes the WSS Switching Identifier in step 204. The Handoff Required message may further include at least one of a Round Trip Delay (RTD), such as Code Division Multiple Access (CDMA) Serving One Way Delay, an MSC Identifier, a Cell Identifier, a Sector Identifier, a Current Macrocell channel on which the MS 140 is active, Electronic Serial Number (ESN) and International Mobile Subscriber Identity (IMSI) identifiers of MS 140, a Long Code Mask assigned to MS 140 by MBS 100. The Long Code Mask assigned to MS 140 by MBS 100 may be ESN based, Mobile Equipment IDentifier (MEID) based, MBS 140 based (Base Station Assigned Long code mask), or the like.

Upon receiving the Handoff Required message from MBS 100 at step 204, MSC 110 determines a corresponding WSS (in this case, WSS 130) based on the WSS Switching Identifier included in the Handoff Required message. MSC 110 determines WSS 130 based on the WSS Switching Identifier included in the Handoff Required message using a handoff routing table. MSC 110 then transmits a message to WSS 130 in step 206. The message transmitted at step 206 may be an IS-41 FACilities DIRective (FACDIR) message.

Upon receiving the message at step 206, WSS 130 determines a set of Femtocells that are candidates for the handoff. While candidate Femtocells may be determined according to any technique, techniques for WSS 130 to determine candidate Femtocells according to exemplary embodiments of the present invention will be described below.

In one exemplary technique for WSS 130 to determine candidate Femtocells, WSS 130 utilizes RTD between the MS 140 and MBS 100 to determine the distance between MBS 100 and MS 140. Herein, RTD information may be computed by MBS 100 and included in the Handoff Required message at step 204 and further included in the message at step 206. The RTD information may be CDMA Serving One Way delay information. WSS 130 may also include or have access to a database, referred to as a Macrocell database, which contains Macrocell information such as at least one of an MSC Identifier, a MBS Identifier, a Sector Identifier, Latitude/Longitude, Azimuth and Beamwidth. In addition, WSS 130 may include or have access to a database, referred to as a Femtocell database, that contains Femtocell information including Latitude/Longitude information. The Macrocell database and the Femtocell database may be combined or separate.

Using the Macrocell database, WSS 130 retrieves the Latitude/Longitude, Azimuth and Beamwidth of the MBS 100. WSS 130 then uses the distance of MS 140 to MBS 100 determined by the RTD, and the Latitude/Longitude, Azimuth and Beamwidth of MBS 100, to determine a Wedge Area. The Wedge Area is a limited area of the Macrocell 101 within which MS 140 is located. Thereafter, WSS 130 determines which Femtocells are disposed within the Wedge Area. The Femtocells that are disposed within the Wedge Area are determined by WSS 130 as the candidate Femtocells for the handoff.

The technique described above for WSS 130 to determine candidate Femtocells is described in greater detail below with reference to FIG. 3.

Figure 3:
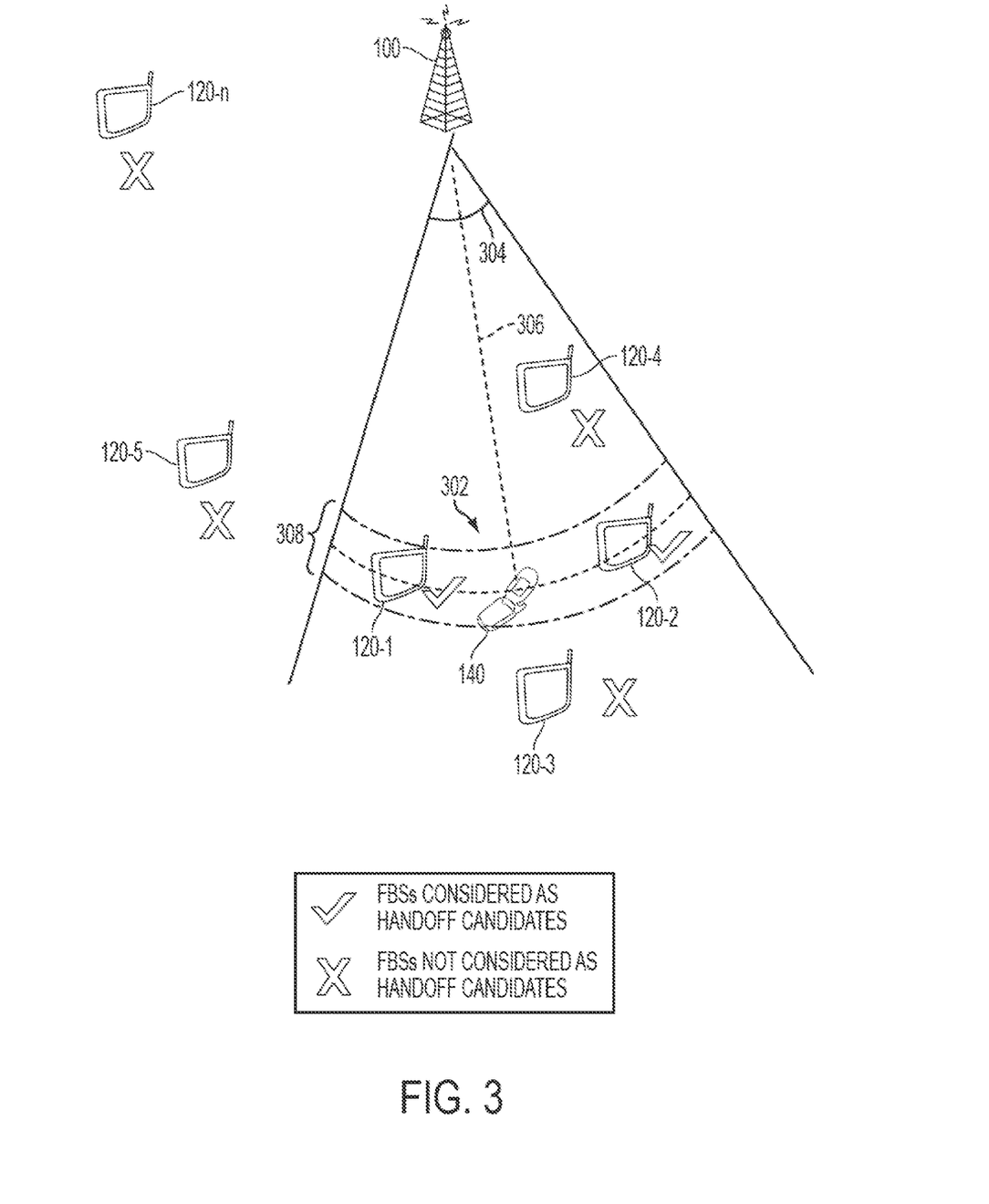
FIG. 3 illustrates a technique for a Wireless Soft Switch (WSS) to determine candidate Femtocells for Macrocell to Femtocell handoff in a wireless communication system according to an exemplary embodiment of the present invention.

FIG. 3 illustrates a technique for a WSS to determine candidate Femtocells for Macrocell to Femtocell handoff in a wireless communication system according to an exemplary embodiment of the present invention.

Referring to FIG. 3, MBS 100, FBSs 120-1 . . . 120-n, and MS 140 are shown. Here, WSS 130 determines which of FBSs 120-1 . . . 120-n are candidate FBSs for handoff. To do so, WSS 130 determines whether FBSs 120-1 . . . 120-n are located within a Wedge Area 302. The Wedge Area 302 is defined based on the coverage 304 of the MBS 100 as determined using Azimuth and Beamwidth of MBS 100, and a distance 306 between the MBS 100 and MS 140 within an error range 308.

In order to determine if an FBS is within the Wedge Area 302, WSS 130 determines an angle X from MBS 100 to the one of FBSs 120-1 . . . 120-n being evaluated. Once the angle X is determined, WSS 130 compares the angle X to the coverage 304 of the MBS 100 using the Azimuth and Beamwidth of MBS 100. In addition, WSS 130 compares the distance 304 between MBS 100 and MS 140 to the distance between MBS 100 and the one of FBSs 120-1 . . . 120-n being evaluated. This process is performed for each of the FBSs 120-1 . . . 120-n. The process described above will now be described in further detail below.

The angle (X) from MBS 100 to the one of FBSs 120-1 . . . 120-n being evaluated is determined by first computing 'x' and 'y' using the Equations (1) and (2).

$$\text{(FBS Longitude–MBS Longitude)}*\text{COS(MBS Latitude)} = x \quad \text{Equation (1)}$$

$$\text{(FBS Latitude–MBS Latitude)} = y \quad \text{Equation (2)}$$

Once 'x' and 'y' from Equations (1) and (2) are computed, WSS 130 determines the value of angle X. When one of 'x' and 'y' is zero, angle X is determined according to Equations (3)-(6).

$$x=0 \text{ and } y>0, X=0 \quad \text{Equation (3)}$$

$$x>0 \text{ and } y=0, X=90 \quad \text{Equation (4)}$$

$$x=0 \text{ and } y<0, X=180 \quad \text{Equation (5)}$$

$$x<0 \text{ and } y=0, X=270 \quad \text{Equation (6)}$$

When neither of 'x' and 'y' is zero, angle X is determined according to the Equations (7)-(11).

$$z=|\text{ARCTAN}(y/x)| \quad \text{Equation (7)}$$

$$\text{if } x>0 \text{ and } y>0, X=90-z \quad \text{Equation (8)}$$

$$\text{if } x<0 \text{ and } y>0, X=270+z \quad \text{Equation (9)}$$

$$\text{if } x<0 \text{ and } y<0, X=270-z \quad \text{Equation (10)}$$

$$\text{if } x>0 \text{ and } y<0, X=90+z \quad \text{Equation (11)}$$

Furthermore, Equations (7)-(11) may be simplified as Equations (12)-(14).

$$z=\text{ARCTAN}(y/x) \quad \text{Equation (12)}$$

$$\text{if } x>0, X=90-z \quad \text{Equation (13)}$$

$$\text{if } x<0, X=270-z \quad \text{Equation (14)}$$

Once the angle X is determined using the equations presented above, WSS 130 determines if:

$$(\text{Azimuth}+\text{Beamwidth}/2) \leq X \leq (\text{Azimuth}-\text{Beamwidth}/2). \quad \text{Equation (15)}$$

If Equation (15) is true, the one of FBSs 120-1 . . . 120-n being evaluated lies within the coverage 304 of the MBS 100 and thus lays within two of the four boundaries that define the Wedge Area 302. The other of the two boundaries that define the Wedge Area are determined based on a distance 306 between the MS 140 to MBS 100, within an error range 308. Accordingly, the one of FBSs 120-1 . . . 120-n being evaluated is determined to lay within the other of the two boundaries that define the Wedge Area 302 if the distance between MBS 100 and the one of FBSs 120-1 . . . 120-n being evaluated corresponds to the distance 306 of the MS 140 to MBS 100, within the error range 308.

Any of the FBSs 120-1 . . . 120-n determined to lay within the Wedge Area 302 are determined to be candidate FBSs.

Another technique for WSS 130 to determine candidate Femtocells is described in below with reference to FIG. 4.

Figure 4:
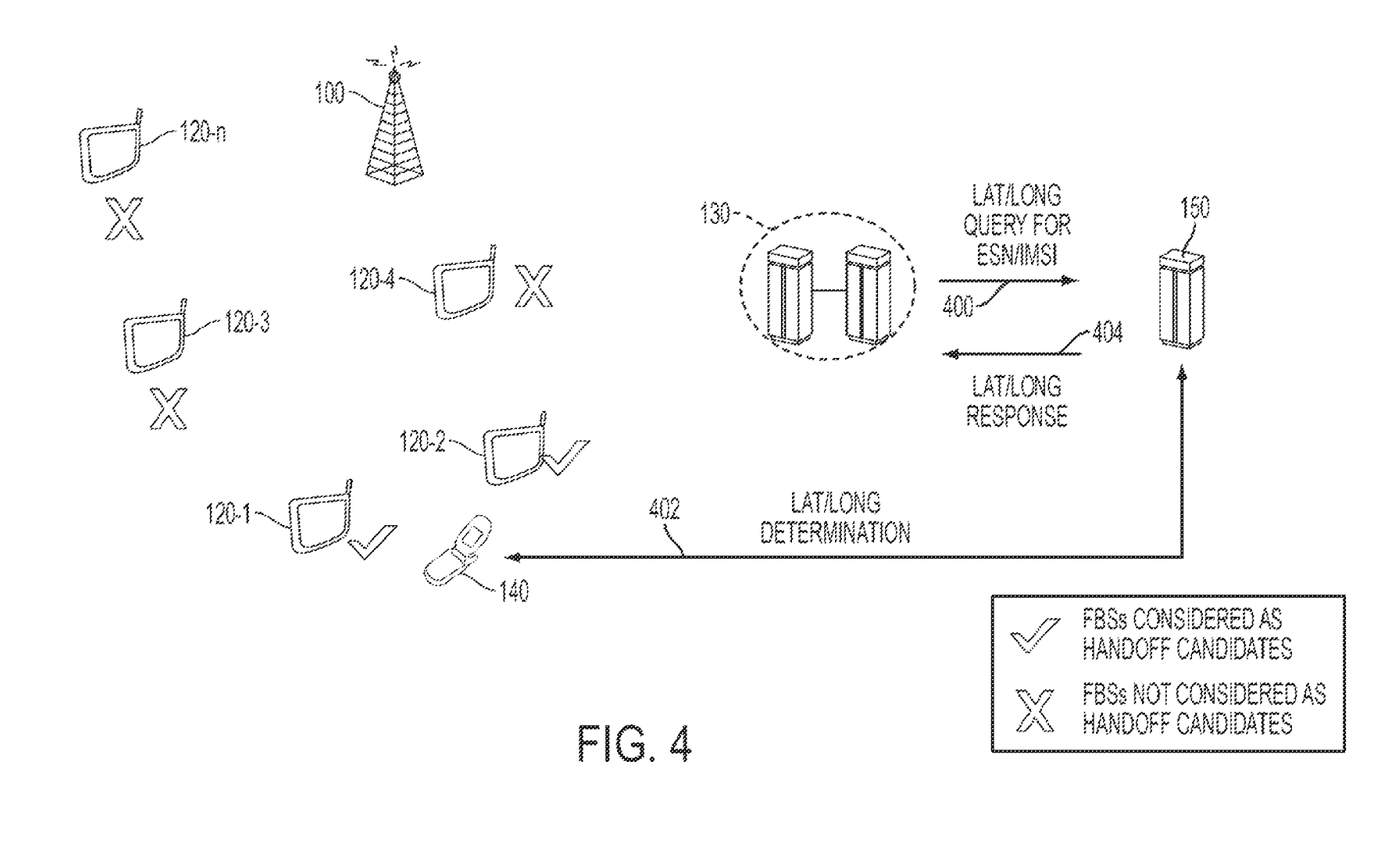
FIG. 4 illustrates a technique for a WSS to determine candidate Femtocells for Macrocell to Femtocell handoff in a wireless communication system according to an exemplary embodiment of the present invention.

FIG. 4 illustrates a technique for a WSS to determine candidate Femtocells for Macrocell to Femtocell handoff in a wireless communication system according to an exemplary embodiment of the present invention.

Referring to FIG. 4, MBS 100, FBSs 120-1 . . . 120-n, MS 140, WSS 130 and a Position Determining Entity (PDE) 150 are shown. PDE 150 is a network element that aids MS 140 in determining its Latitude/Longitude. WSS 130 determines candidate FBSs using PDE 150. Upon receipt of the message at step 206, WSS 130 may transmit a Latitude/Longitude request message to PDE 150 for the Latitude/Longitude of MS 140 in step 400. The request message may include at least one of the ESN and the IMSI of MS 140. PDE 150 will then obtain the Latitude/Longitude of MS 140 from the MS 140 in step 402. Once PDE 150 obtains the Latitude/Longitude of MS 140, PDE 150 sends the Latitude/Longitude of MS 140 to WSS 130 in a Latitude/Longitude response message in step 404. WSS 130 then compares the location of MS 140 with the locations of the FBS 120-1 . . . 120-n to identify FBSs within a certain distance from MS 140 as candidate FBSs. Here, it is assumed that FBS 120-1 and FBS 120-2 have been determined to be candidate FBSs.

Returning to FIG. 2, once WSS 130 determines the candidate FBSs, such as by using one of the above two exemplary implementations, WSS 130 selects a target FBS for handoff, from among the candidate FBSs. To achieve this, WSS 130 sends a Handoff Request message to each of the respective candidate FBSs 120-1 and 120-2 in steps 208-1 and 208-2. The Handoff Request message may indicate that the request is a "Candidate Request". Upon receipt of the respective Handoff Request message, each of the candidate FBSs 120-1 and 120-2 will use the Long Code Mask of MS 140 to detect the ongoing reverse channel transmission of MS 140 in steps 210-1 and 210-2. When detecting the ongoing reverse channel transmission of MS 140, FBS 120-1 and FBS 120-2 will measure a signal strength and RTD of the reverse channel transmission of MS 140. Each of the candidate FBSs 120-1 and 120-2 will then report the measured signal strength and RTD to WSS 130 in steps 212-1 and 212-2.

WSS 130 then determines which of FBS 120-1 and FBS 120-2 measured the strongest signal strength of the reverse link of MS 140. However, if the signal strength measured by FBS 120-1 and FBS 120-2 are equally strong, then WSS 130 determines which of FBS 120-1 and FBS 120-2 is the closest to MS 140 based on the RTD measurement (i.e., has the shortest RTD). However, if both RTD and signal strength measurements are substantially the same, then either one of FBS 120-1 and FBS 120-2 may be chosen.

In this case, it is assumed that FBS 120-1 is determined to have measured the strongest signal strength of the reverse link of MS 140 and thus is determined to be the target FBS to use for handoff. Accordingly, WSS 130 sends a Handoff Request message to FBS 120-1 in step 214. The Handoff Request message sent at step 214 includes an indication of "Candidate Accept". FBS 120-1 will then assign traffic resources and send a Handoff Request Acknowledgment (Ack) message to WSS 130 in step 216. The Handoff Request Ack message sent in step 216 may include the operational carrier and Pilot PN of FBS 120-1. WSS 130 then sends a message to the MSC 110 in step 218. The message may include an identifier of FBS 120-1 and/or the operational carrier and Pilot PN of FBS 120-1. Further, the message sent at step 218 may be an IS-41 FACDIR2 message.

MSC 110 then sends a Handoff Command message to MBS 100 in step 220. The Handoff Command message sent at step 220 may include an identifier of FBS 120-1 and/or the operational carrier and Pilot PN of FBS 120-1. MBS 100 then sends a message to MS 140 in step 222. The message sent at step 220 may include an identifier of FBS 120-1 and/or the operational carrier and Pilot PN of FBS 120-1. The message sent at step 220 may be a Universal Handoff-Direction Message (UHDM). MS 140 then acquires FBS 120-1 and sends a Handoff Complete message to FBS 120-1 in step 224. Next, FBS 120-1 sends a Handoff Complete message to WSS 130 in step 226. WSS then sends a message to MSC 130 in step 228. The message sent at step 228 may be an IS-41 MS ON channel message. MSC 130 then sends a Clear Command message to MBS 100 in step 230. Thereafter the technique for Macrocell to Femtocell handoff according to an exemplary embodiment of the present invention is ended.

Femtocell to Femtocell Handoff

Hereafter, techniques for Femtocell to Femtocell handoff according to exemplary embodiments of the present invention are described. To facilitate handoff between the Femtocells, each FBS is populated with information on neighboring FBSs. The information on neighboring FBSs may be included in a Femtocell neighbor list. The Femtocell neighbor list may be configured automatically based on the information provided by a Femtocell management system, such as WSS 130. The Femtocell management system may provide information to respective FBSs on the operational carrier and Pilot PN of their neighboring FBSs.

To perform Femtocell to Femtocell handoff, an MS in an active call should report signal strengths of detected pilot signals of FBSs to its serving FBS. However, the detection of the pilot signals is based on neighbor search information provided to the MS from its serving FBS. FBSs may choose to perform handoff via either a neighbor FBS's beacon carrier or directly to the neighbor FBS's operational carrier. The choice of using neighbor FBS's beacon carrier or operational carrier for handoff depends on several factors and use cases. For example, in enterprise type cluster Femtocell deployments, not all Femtocells may have beacon carriers. In this case, handoff should to be performed via the operational carriers. Typically in such cluster environments, there may be ingress and outgress Femtocells that utilize beacons while the remaining Femtocells only utilize operational channels. However, even when all Femtocells have beacons, handoff via operational carriers may be chosen as a preferred approach. Based on the FBS's choice to perform handoff via either a neighbor FBS's beacon carrier or the neighbor FBS's operational carrier, the FBS sends the corresponding neighbor search information to the MS during an active call.

To assist with Femtocell to Femtocell handoff, each FBS is assigned a unique identifier by the FemtoCell management system. The combination of Neighbor Femtocell Carrier and Pilot PN can be used as a distinct way to map to the Neighbor Femtocell identifier. This way, the WSS can uniquely identify the Neighbor Femtocell during the handoff process. Such unique mapping of carrier/PN to Femtocell identifier is feasible if the neighbor FBSs use different combinations of carrier and PN. This technique may be used when the handoff search is done with the operational carrier and not the beacon carrier of the neighbors. This is because in case of beacon carriers all neighbors would have the same beacon carrier and beacon Pilot PN in order to match the Macro carriers and neighbor list information.

On the other hand, the operational carrier of neighbor FBSs may be different depending on the availability of carriers. However, even if carriers are limited, the Pilot PNs on the operational carrier may be selected differently so that a unique combination of carrier and PN may be established among neighboring Femtocells. This way, the mapping of carrier/PN to the FBS's Femtocell identifier may be established uniquely.

A technique for Femtocell to Femtocell handoff when neighboring FBSs do not have the same operational FA and PN according to an exemplary embodiment of the present invention is described below with reference to FIG. 5.

Figure 5:
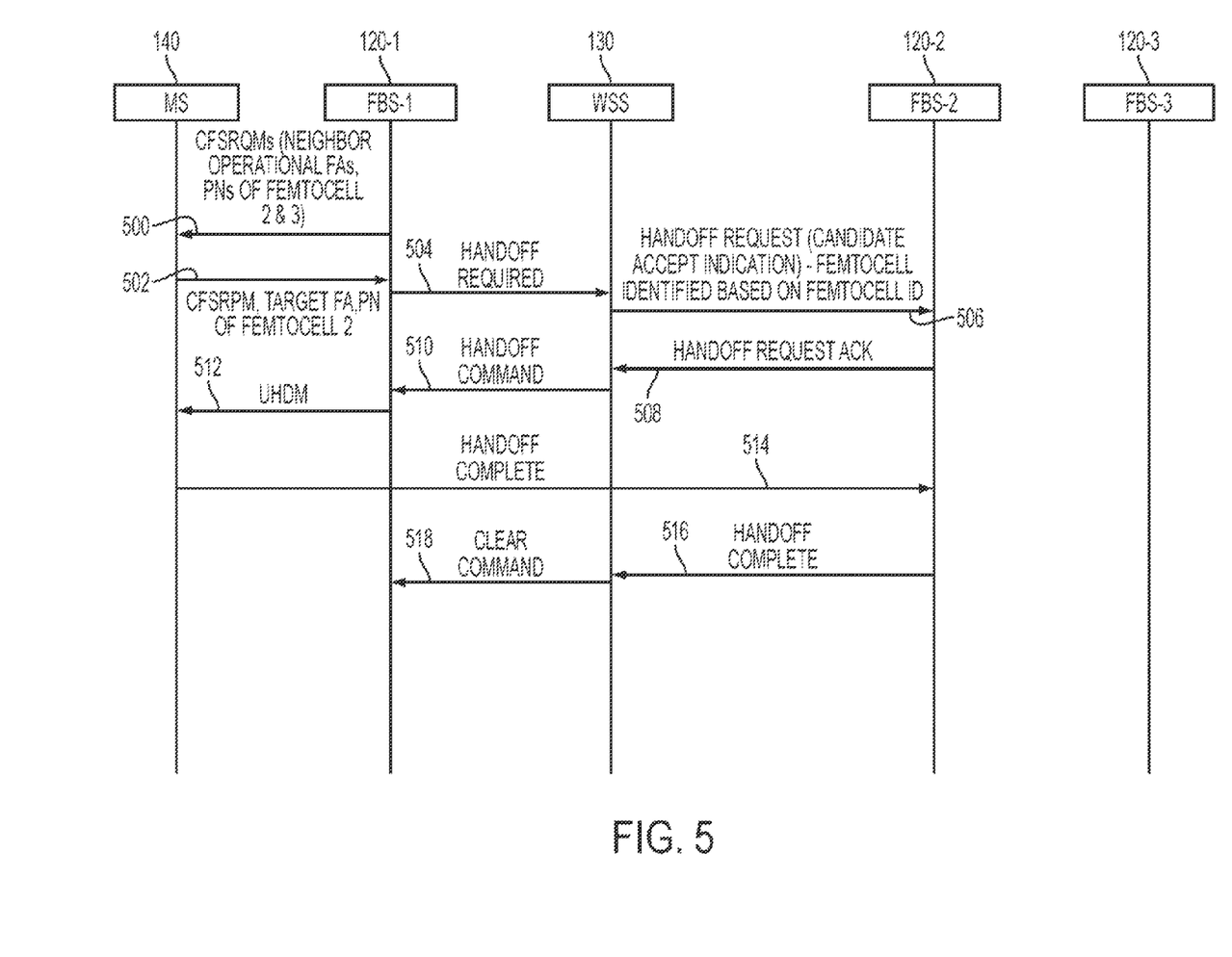
FIG. 5 is a signal diagram for Femtocell to Femtocell handoff in a wireless communication system when neighboring Femtocell Base Stations (FBSs) do not use the same operational Frequency Allocation (FA) and Pseudo-random Noise (PN) code according to according to an exemplary embodiment of the present invention.

FIG. 5 is a signal diagram for Femtocell to Femtocell handoff in a wireless communication system when neighboring FBSs do not have the same operational FA and PN code according to according to an exemplary embodiment of the present invention.

Referring to FIG. 5, it is assumed that FBS 120-1 is serving MS 140 in an active call and FBS 120-2 and FBS 120-3 are neighbors to FBS 120-1. During the active call with MS 140, FBS 120-1 sends a Candidate Frequency Search Request Message (CFSRQM) to MS 140 in step 500. The CFSRQM includes search parameters, such as neighbor operations FAs, and PNs of FBS 120-2 and FBS 120-3. Once MS 140 detects a pilot signal corresponding to the search parameters included in the CFSRQM, MS 140 sends a Candidate Frequency Search Response Message (CFSRPM) to MS 140 in step 502. It is assumed herein that MS 140 detected FBS 120-2. Accordingly, the CFSRPM includes the FA and PN of FBS 120-2. Thereafter, FBS 120-1 sends a Handoff Required message to WSS 130 in step 504. WSS then determines the Femtocell ID of FBS 120-1 and sends a Handoff Request message to FBS 120-2 indicating candidate accept in step 506. FBS 120-2 then sends a Handoff Request Ack message to WSS 130 in step 508. WSS 130 then sends a Handoff Command message to FBS 120-1 in step 510. FBS 120-1 then sends a UHDM to MS 140 in step 512. MS 140 then acquires FBS 120-2 and sends a Handoff Complete message to FBS 120-2 in step 514. FBS 120-2 then sends a Handoff Complete message to WSS 130 in step 516. WSS 130 then sends a Clear Command to FBS 120-1 in step 518. Thereafter, the procedure for Femtocell to Femtocell handoff when neighboring FBSs do not have the same operational FA and PN according to an exemplary embodiment of the present invention is complete.

In the situation where the beacon carriers are used for the handoff search or if the operational carriers are re-used, such as that of the Macro carriers (in which case the Operational Pilot PN has to be matched to that of the Macro Neighbor List), a unique mapping of carrier/PN to Femtocell identifier cannot be established since neighboring Femtocells on two sides of a Femtocell may be re-using the same Macro carrier and the operational PN without overlapping. In this case, the Femtocell cannot distinguish its neighbor FBSs based on carrier and PN information. In such cases, WSS and FBSs may use the Long Code Mask based Reverse Link sensing technique to identify the target FBS for the handoff. The Long Code Mask based Reverse Link sensing technique is substantially the same as that described for Macrocell to Femtocell handoff.

Here, the FBS will report in a Handoff Required message multiple Femtocell IDs that have the same carrier and PN. The WSS may then send a Handoff Request message with Candidate Request indication to all these Femtocells. The Femtocells may then use the Long Code Mask based reverse link sensing and report the signal strength information to the WSS. The WSS will then identify the target FBS and send a Handoff Request message with a Candidate Accept indication to the selected target FBS.

A technique for Femtocell to Femtocell handoff when neighboring FBSs have the same operational FA and PN according to an exemplary embodiment of the present invention is described below with reference to FIG. 6.

Figure 6:
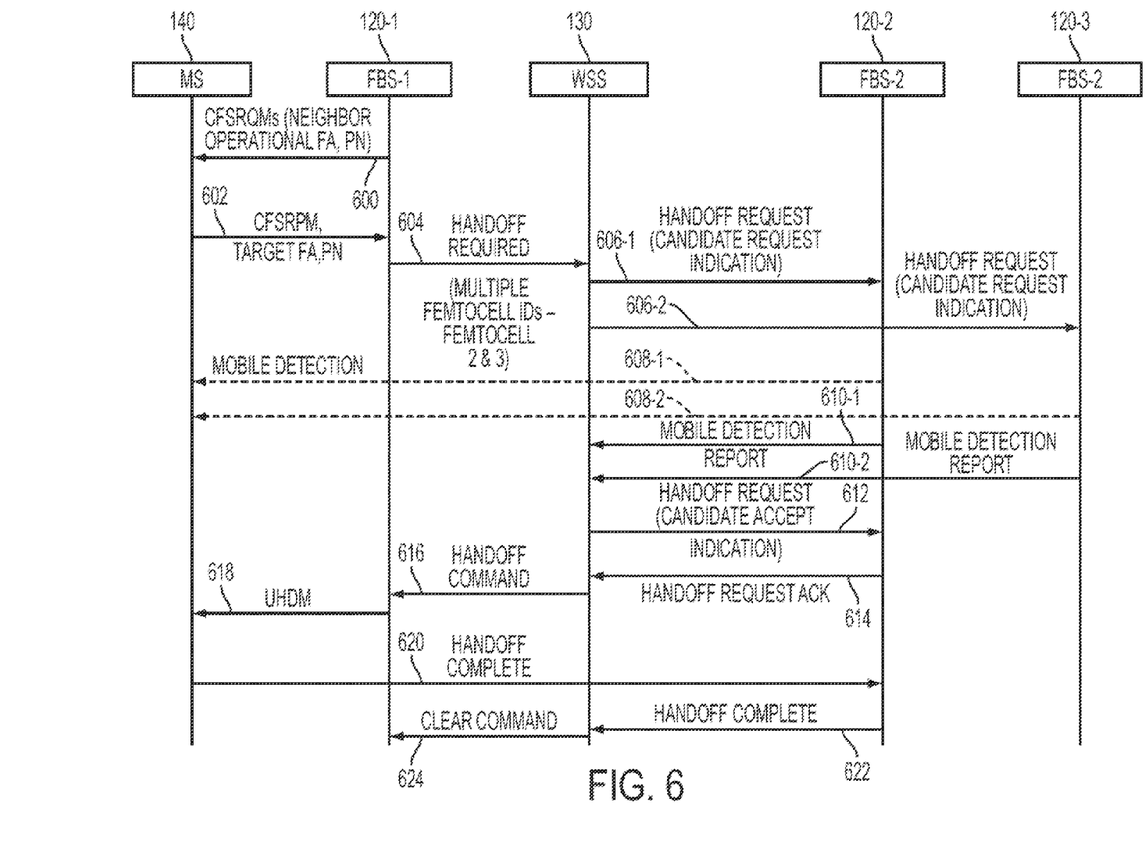
FIG. 6 is a signal diagram for Femtocell to Femtocell handoff in a wireless communication system when neighboring FBSs use the same operational FA and PN code according to according to an exemplary embodiment of the present invention.

FIG. 6 is a signal diagram for Femtocell to Femtocell handoff in a wireless communication system when neighboring FBSs have the same operational FA and PN code according to according to an exemplary embodiment of the present invention.

Referring to FIG. 6, it is assumed that FBS 120-1 is serving MS 140 in an active call and FBS 120-2 and FBS 120-3 are neighbors to FBS 120-1. During the active call with MS 140, FBS 120-1 sends a CFSRQM to MS 140 in step 600. The CFSRQM includes search parameters, such as neighbor operations FAs, and PNs of FBS 120-2 and FBS 120-3. Once MS 140 detects a pilot signal corresponding to the search parameters included in the CFSRQM, MS 140 sends a CFSRPM to MS 140 in step 602. It is assumed herein that MS 140 detected FBS 120-2 and FBS 120-3. Accordingly, the CFSRPM includes the FA and PN of FBS 120-2 and FBS 120-2. Thereafter, FBS 120-1 sends a Handoff Required message to WSS 130 in step 604. Here, the Handoff Required message includes the Femtocell IDs for FBS 120-2 and FBS 120-3.

WSS 130 identifies FBSs 120-2 and 120-3 based on the Femtocell IDs included in the Handoff Required message. WSS 130 then sends a Handoff Request message to each of FBSs 120-2 and 120-3 in steps 606-1 and 606-2. The Handoff Request message may indicate that the request is a "Candidate Request". Upon receipt of the respective Handoff Request message, each of FBSs 120-2 and 120-3 will use the Long Code Mask of MS 140 to detect the ongoing reverse channel transmission of MS 140 in step 608-1 and 608-2. When detecting the ongoing reverse channel transmission of MS 140, FBS 120-2 and FBS 120-3 will measure a signal strength and RTD of the reverse channel transmission of MS 140. Each of FBS 120-2 and FBS 120-3 will then report the measured signal strength and RTD to WSS 130 in steps 610-1 and 610-2.

WSS 130 then determines which of FBS 120-1 and FBS 120-2 measured the strongest signal strength of the reverse link of MS 140. However, if the signal strength measured by FBS 120-2 and FBS 120-3 are equally strong, then WSS 130 determines which of FBS 120-3 and FBS 120-3 is the closest to MS 140 based on the RTD measurement. However, if both RTD and signal strength measurements are same, then either one of FBS 120-3 and FBS 120-4 may be chosen.

In this case, it is assumed that FBS 120-2 is determined to have measured the strongest signal strength of the reverse link of MS 140 and thus is determined to be the FBS to use for handoff. Accordingly, WSS 130 sends a Handoff Request message to FBS 120-2 in step 612. The Handoff Request message sent at step 612 includes an indication of "Candidate Accept". FBS 120-2 will then assign traffic resources and send a Handoff Request Acknowledgment (Ack) to WSS 130 in step 614

WSS 130 then sends a Handoff Command message to FBS 120-1 in step 616. FBS 120-1 then sends a UHDM to MS 140 in step 618. MS 140 then sends a Handoff Complete message to FBS 120-2 in step 620. FBS 120-2 then sends a Handoff Complete message to WSS 130 in step 622. WSS 130 then sends a Clear Command to FBS 120-1 in step 624. Thereafter, the procedure for Femtocell to Femtocell handoff when neighboring FBSs have the same operational FA and PN according to an exemplary embodiment of the present invention is complete.

A structure of a WSS for use in a wireless communication system according to an exemplary will be described below with reference to FIG. 7.

Figure 7:
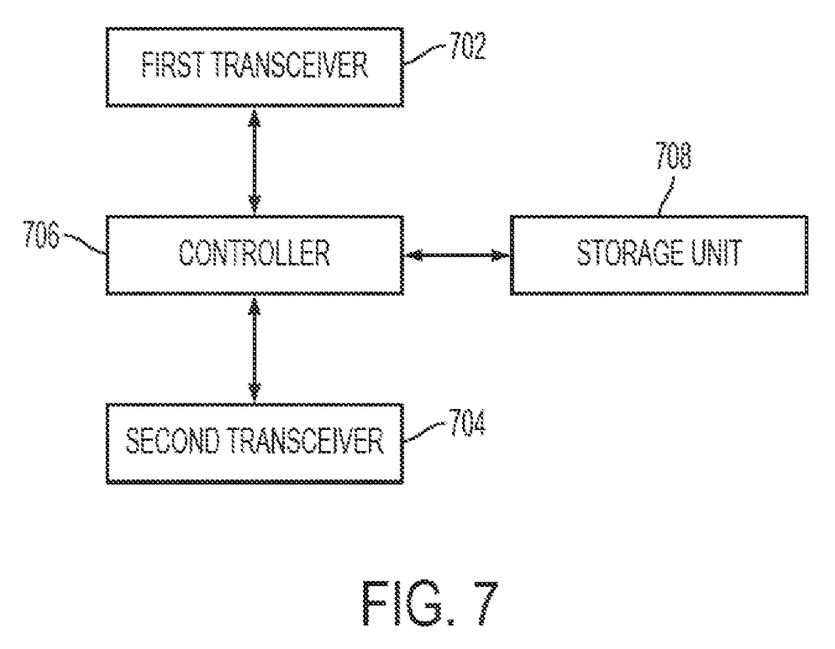
FIG. 7 is a block diagram illustrating a WSS for use in a wireless communication system according to an exemplary embodiment of the present invention.

FIG. 7 is a block diagram illustrating a WSS for use in a wireless communication system according to an exemplary embodiment of the present invention.

Referring to FIG. 7, WSS 130 includes a first transceiver 702, a second transceiver 704, a controller 706, and a storage unit 708. WSS 130 may include any number of additional structural elements. However, a description of additional structural elements of WSS 130 is omitted for conciseness.

The first transceiver 702 transmits to and receives messages from FBSs 120-1 ... 120-n. Herein, the WSS 130 and FBSs 120-1 ... 120-n may communicate via a commercial broadband network.

The second transceiver 704 transmits to and receives messages from the MBS 100 via MSC 110. Herein, the WSS 130 may communicate with MBS 100 via MSC 110 through a backbone network of the wireless communication system.

The controller 706 controls overall operations of WSS 130. The operations of WSS 130 include any of the operations explicitly or implicitly described above as being performed by WSS 130. For example, the controller 706 may control to receive a message indicating that handoff of an MS 140 to an FBS should be performed, determines one or more candidate FBSs for the handoff, determines the target FBS, from the one or more candidate FBSs, to which the MS 140 is to handoff, and controls to exchange messages with the MS 140, MBS 100, and target FBS for the handoff of the MS 140 from the MBS 100 to the target FBS.

The storage unit 708 stores programs required for overall operations of the WSS 130 and various data. In addition, the storage unit 708 may store the Macrocell database and the Femtocell database.

A structure of a FBS, such as any of FBSs 120-1 ... 120-n for use in a wireless communication system according to an exemplary will be described below with reference to FIG. 8.

Figure 8:
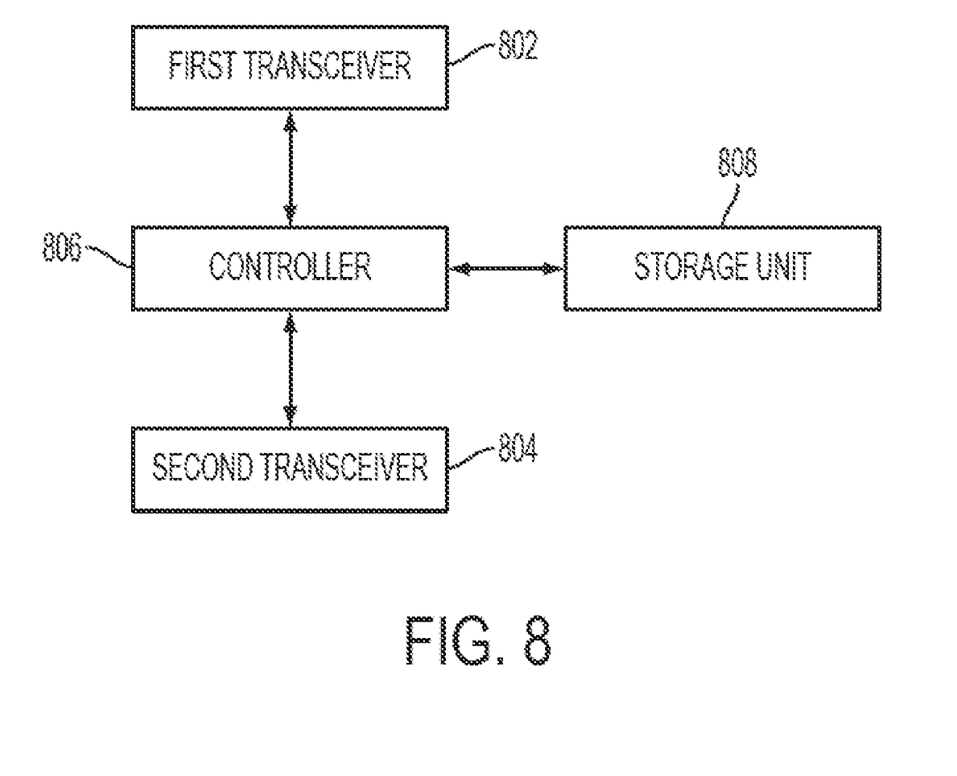
FIG. 8 is a block diagram illustrating an FBS for use in a wireless communication system according to an exemplary embodiment of the present invention.

FIG. 8 is a block diagram illustrating an FBS for use in a wireless communication system according to an exemplary embodiment of the present invention.

Referring to FIG. 8, the FBS includes a first transceiver 802, a second transceiver 804, a controller 806, and a storage unit 808. The FBS may include any number of additional structural elements. However, a description of additional structural elements of the FBS is omitted for conciseness.

The first transceiver 802 transmits to and receives messages from WSS 130. Herein, the FSB and WSS 130 may communicate via a commercial broadband network.

The second transceiver 804 transmits to and receives messages from the MS 140. Herein, the second transceiver 804 may operate according to a wireless communications standard.

The controller 806 controls overall operations of the FSB. The operations of FSB include any of the operations explicitly or implicitly described above as being performed by an FSB. For example, the controller 806 may control to send a message to the MS 140 including neighbor information that comprises a frequency allocation and PN code used by each of the FBSs neighboring the FBS, controls to receive a message from the MS 140 including a frequency allocation and PN code used by an FBS detected by the MS 140, determines an identifier for each of at least one FBS using the frequency allocation and PN code received from the MS 140, controls to send a message to the WSS 130 indicating that handoff of the MS 140 should be performed, the message including the determined identifier for each of the at least one FBS using the frequency allocation and PN code received from the MS 140, and controls to exchange messages with the MS 140 and WSS 130 for the handoff of the MS 140 from the FBS to the target FBS, wherein the target FBS is one of the at least one FBS using the frequency allocation and PN code received from the MS 140.

The storage unit 808 stores programs required for overall operations of the WSS 130 and various data. In addition, the storage unit 808 may store the Femtocell neighbor list.

Exemplary embodiments of the present invention facilitate Macrocell to Femtocell and Femtocell to Femtocell handoff in a wireless communication system.

Certain aspects of the present invention may also be embodied as computer readable code on a computer readable recording medium. A computer readable recording medium is any data storage device that can store data, which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for handing off a Mobile Station (MS) from a Macrocell Base Station (MBS) to a target Femtocell Base Station (FBS) in a wireless network, the method comprising:
   receiving, by a Wireless Soft Switch (WSS), a message indicating that handoff of an MS to an FBS should be performed;
   determining, by the WSS, one or more candidate FBSs for the handoff;
   determining, by the WSS, the target FBS, from the one or more candidate FBSs, to which the MS is to handoff; and
   exchanging messages with the MS, MBS, and the target FBS for the handoff of the MS from the MBS to the target FBS.

2. The method of claim 1, further comprising:
   receiving, at the MBS, a message from the MS including a Pseudo-random Noise (PN) code used in a beacon signal transmitted by an FBS;
   determining, at the MBS, an WSS identifier based on the PN code; and
   transmitting, at the MBS, the message indicating that the handoff of the MS should be performed.

3. The method of claim 2, wherein the message indicating that the handoff of the MS should be performed comprises at least one of a Round Trip Delay (RTD) between the MS and MBS, an MSC Identifier, a Cell Identifier, a Sector Identifier, a Current Macrocell channel on which the MS is active, Electronic Serial Number (ESN) and International Mobile Subscriber Identity (IMSI) identifiers of the MS, and a Long Code Mask assigned to the MS by the MBS.

4. The method of claim 1, further comprising:
receiving, at a Mobile Switching Center, a message from the MBS indicating that handoff of an MS to an FBS should be performed, the message including a WSS identifier; and
routing the message from the MBS to the WSS based on the WSS identifier.

5. The method of claim 1, wherein the determining, by the WSS, of the one or more candidate FBSs for the handoff comprises:
identifying, by the WSS, one or more FBSs located within an area the MS is located in, wherein the area is determined based on a longitude, latitude, azimuth and beamwidth of the MBS, a longitude and latitude of the MS, and a distance between the MBS and MS; and
determining, by the WSS, the one or more FBSs located within the area and the one or more candidate FBSs for the handoff.

6. The method of claim 1, wherein the determining, by the WSS, of the one or more candidate FBSs for the handoff comprises:
requesting, by the WSS, location information of the MS from a Position Determining Entity (PDE); and
receiving, by the WSS, the location information of the MS from the PDE.

7. The method of claim 1, wherein the determining, by the WSS, the target FBS, from the one or more candidate FBSs, to which the MS is to handoff comprises:
sending, by the WSS, a message to the one or more candidate FBSs requesting at least one of a signal strength and a round trip delay measurement of signals transmitted by the MS to the MBS;
receiving, by the WSS, the at least one of the signal strength and the round trip delay measurement of signals transmitted by the MS to the MBS, from each of the one or more candidate FBSs; and
determining, by the WSS, the target FBS from the one or more candidate FBSs that measured at least one of the greatest signal strength and shortest round trip delay.

8. The method of claim 1, further comprising:
receiving, by each of the each of the one or more candidate FBSs, a message from the WSS requesting at least one of a signal strength and a round trip delay measurement of signals transmitted by the MS to the MBS;
determining, by each of the each of the one or more candidate FBSs, the at least one of the signal strength and the round trip delay measurement of signals transmitted by the MS to the MBS; and
transmitting to the WSS, by each of the each of the one or more candidate FBSs, the at least one of the signal strength and the round trip delay measurement of signals transmitted by the MS to the MBS.

9. A Wireless Soft Switch (WSS) apparatus for use in a wireless network to handoff a Mobile Station (MS) from a Macrocell Base Station (MBS) to a target Femtocell Base Station (FBS), the apparatus comprising:
a first transceiver for transmitting to and receiving messages from one or more FBSs;
a second transceiver for transmitting to and receiving messages from the MBS; and
a controller for controlling to receive a message indicating that handoff of an MS to an FBS should be performed, for determining one or more candidate FBSs for the handoff, for determining the target FBS, from the one or more candidate FBSs, to which the MS is to handoff, and for controlling to exchange messages with the MS, MBS, and the target FBS for the handoff of the MS from the MBS to the target FBS.

10. The apparatus of claim 9, wherein the controller, when determining the one or more candidate FBSs for the handoff, identifies one or more FBSs located within an area the MS is located in, wherein the area is determined based on a longitude, latitude, azimuth and beamwidth of the MBS, a longitude and latitude of the MS, and a distance between the MBS and MS, and determines the one or more FBSs located within the area and the one or more candidate FBSs for the handoff.

11. The apparatus of claim 9, wherein the controller, when determining the one or more candidate FBSs for the handoff, controls to request location information of the MS from a Position Determining Entity (PDE), and controls to receive the location information of the MS from the PDE.

12. The apparatus of claim 9, wherein the controller, when determining the target FBS, from the one or more candidate FBSs, to which the MS is to handoff, controls to send a message to the one or more candidate FBSs requesting at least one of a signal strength and a round trip delay measurement of signals transmitted by the MS to the MBS, controls to receive the at least one of a signal strength and a round trip delay measurement from each of the one or more candidate FBSs, and determines the target FBS from the one or more candidate FBSs that measured at least one of the greatest signal strength and shortest round trip delay.

13. The apparatus of claim 9, wherein the message indicating that the handoff of the MS should be performed comprises at least one of a Round Trip Delay (RTD) between the MS and MBS, an MSC Identifier, a Cell Identifier, a Sector Identifier, a Current Macrocell channel on which the MS is active, Electronic Serial Number (ESN) and International Mobile Subscriber Identity (IMSI) identifiers of the MS, and a Long Code Mask assigned to the MS by the MBS.

14. A method for handing off a Mobile Station (MS) from a serving Femtocell Base Station (FBS) to a target FBS in a wireless network, the method comprising:
sending, by the serving FBS, a message to the MS including neighbor information that comprises a frequency allocation and Pseudo-random Noise (PN) code used by each of the FBSs neighboring the serving FBS;
receiving, by the serving FBS, a message from the MS including a frequency allocation and PN code used by an FBS detected by the MS;
determining, by the serving FBS, an identifier for each of at least one candidate FBS using the frequency allocation and PN code received from the MS;
sending, by the serving FBS, a message to a Wireless Soft Switch (WSS) indicating that handoff of the MS should be performed, the message including the determined identifier for each of the at least one candidate FBS using the frequency allocation and PN code received from the MS; and
exchanging messages, by the serving FBS, with the MS and WSS for the handoff of the MS from the serving FBS to the target FBS, wherein the target FBS is one of the at least one candidate FBS using the frequency allocation and PN code received from the MS.

15. The method of claim 14, wherein, when only one candidate FBS uses the frequency allocation and PN code received from the MS, the one FBS is the target FBS.

16. The method of claim 14, wherein, when more than one candidate FBS uses the frequency allocation and PN code received from the MS, the WSS determines the target FBS.

17. The method of claim 16, wherein the WSS determines the target FBS by:
- sending a message to the more than one candidate FBS requesting at least one of a signal strength and a round trip delay measurement of signals transmitted by the MS to the serving FBS;
- receiving the at least one of the signal strength and the round trip delay measurement of signals transmitted by the MS to the serving FBS, from each of the more than one candidate FBS; and
- determining as the target FBS, an FBS of the more than one candidate FBS that measured at least one of the greatest signal strength and shortest round trip delay.

18. The method of claim 16, further comprising:
- receiving, by each of the more than one candidate FBS, a message from the WSS requesting at least one of a signal strength and a round trip delay measurement of signals transmitted by the MS to the serving FBS;
- determining, by each of the more than one candidate FBS, the at least one of the signal strength and the round trip delay measurement of signals transmitted by the MS to the MBS; and
- transmitting to the WSS, by each of the more than one candidate FBS, the at least one of the signal strength and the round trip delay measurement of signals transmitted by the MS to the serving FBS.

19. A Femtocell Base Station (FBS) apparatus for use in a wireless network to handoff a Mobile Station (MS) to a target FBS, the apparatus comprising:
- a first transceiver for transmitting to and receiving messages from a Wireless Soft Switch (WSS);
- a second transceiver for transmitting to and receiving messages from the MS; and
- a controller for controlling to sending a message to the MS including neighbor information that comprises a frequency allocation and Pseudo-random Noise (PN) code used by each of the FBSs neighboring the FBS, for controlling to receive a message from the MS including a frequency allocation and PN code used by an FBS detected by the MS, for determining an identifier for each of at least one FBS using the frequency allocation and PN code received from the MS, for controlling to send a message to the WSS indicating that handoff of the MS should be performed, the message including the determined identifier for each of the at least one FBS using the frequency allocation and PN code received from the MS, and for controlling to exchange messages with the MS and WSS for the handoff of the MS from the FBS to the target FBS, wherein the target FBS is one of the at least one FBS using the frequency allocation and PN code received from the MS.

20. The apparatus of claim 19, wherein, when only one FBS uses the frequency allocation and PN code received from the MS, the one FBS is the target FBS.

21. The apparatus of claim 19, wherein, when more than one FBS uses the frequency allocation and PN code received from the MS, the target FBS is determined by the WSS.

* * * * *